Jan. 22, 1963 A. KULLMAN 3,074,683
SINGLE PLANE TRACER VALVE
Filed April 8, 1959 2 Sheets-Sheet 1
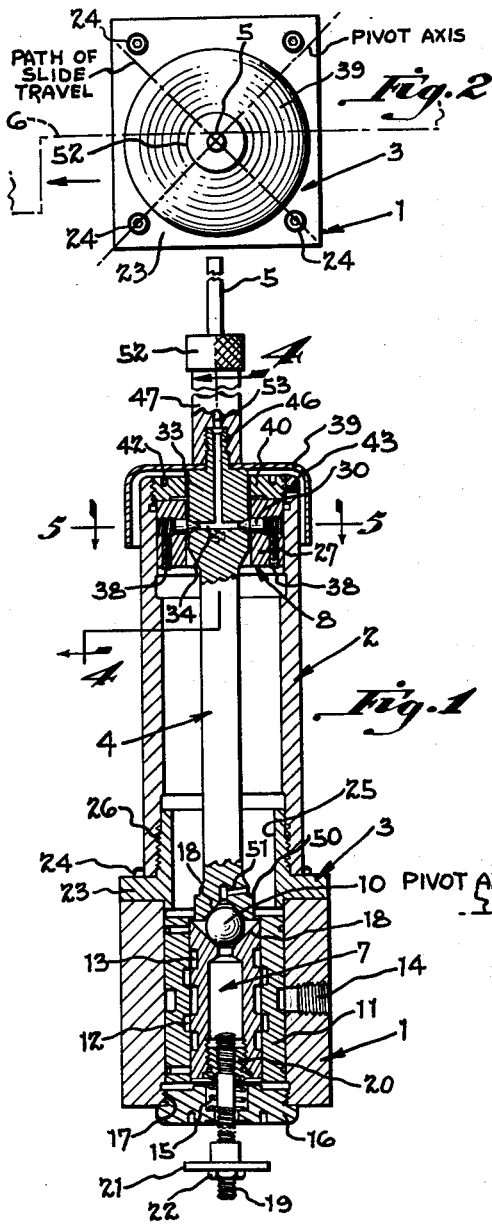
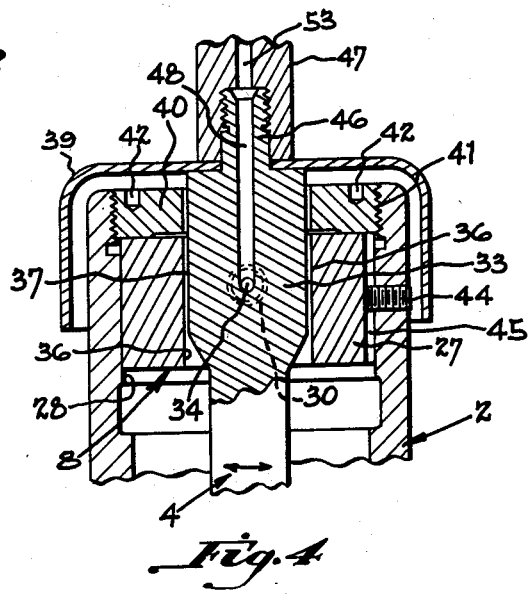
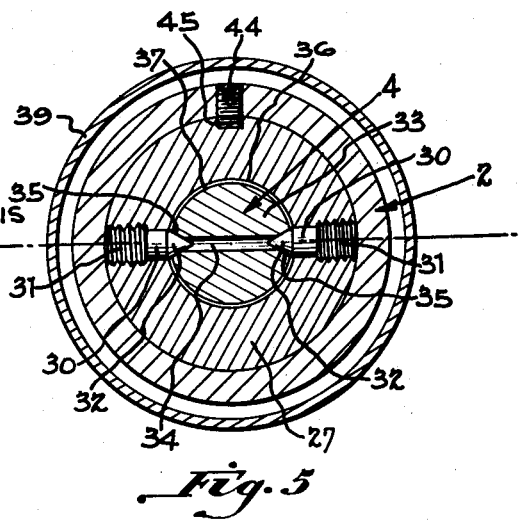
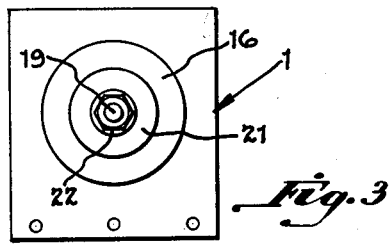
INVENTOR.
Alfred Kullman
BY
Wood, Herron & Evans.
ATTORNEYS.

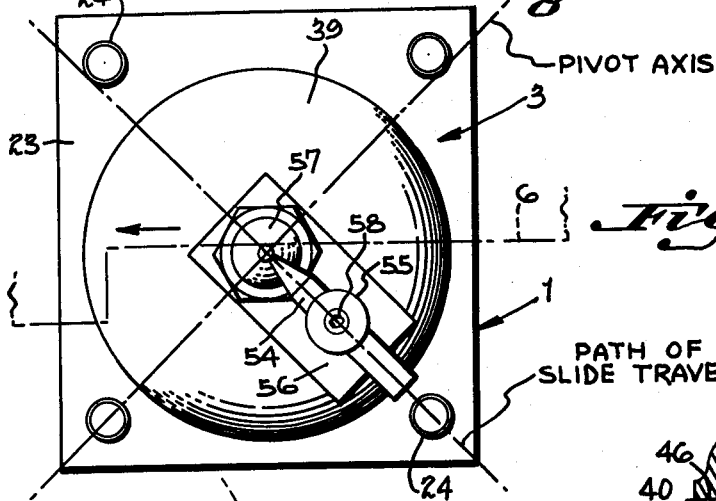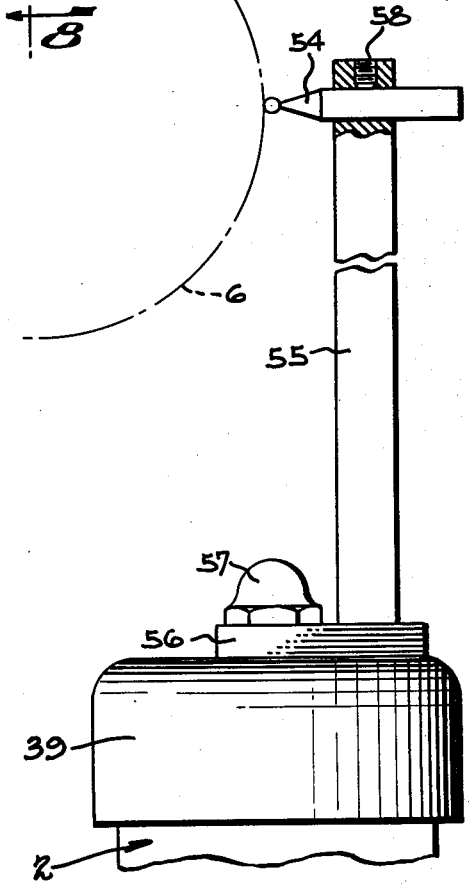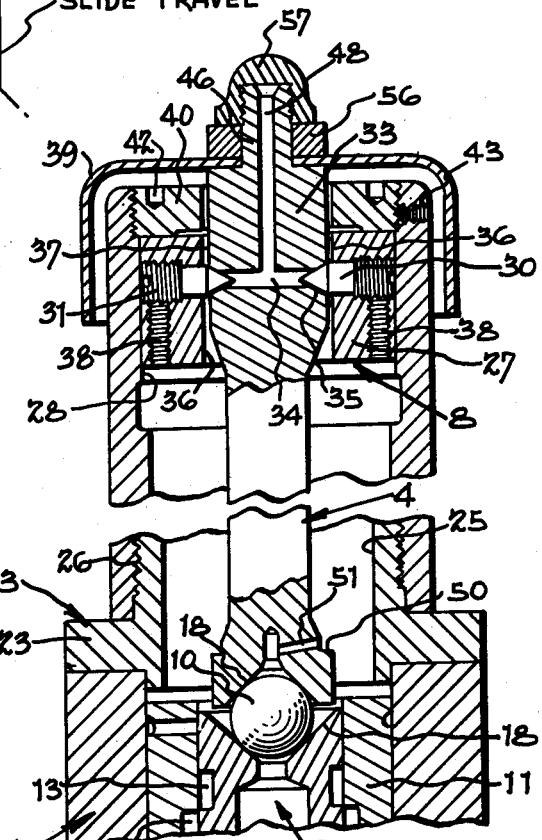

3,074,683
SINGLE PLANE TRACER VALVE
Alfred Kullman, Cincinnati, Ohio, assignor to The American Tool Works Company, Cincinnati, Ohio, a corporation of Ohio
Filed Apr. 8, 1959, Ser. No. 805,047
4 Claims. (Cl. 251—3)

This invention relates to tracer valves for hydraulically controlled machine tools, such as lathes, which are used in the production of duplicate workpieces in an automatic manner. A tracer valve of this character is provided with a stylus arranged to trace the profile of a pattern or template and is interconnected in a hydraulic power circuit arranged to shift the cutting tool in a path which corresponds to the template profile, thereby to reproduce successive workpieces according to the template profile.

One of the primary objectives of the present invention has been to provide a tracer valve of simplified construction, but which is highly sensitive in operation and capable of generating in the workpiece the profile of the template with a greater degree of accuracy than has been possible with tracer apparatus in the past.

In general, one conventional tracer valve presently in use is known as a universal tracer and comprises a valve body having a spring-loaded, axially shiftable valve spool, a tracer spindle projecting axially through the valve body and beyond one end, and a universal joint journalling the spindle within the valve body to permit the spindle to be tilted angularly in all directions with respect to the valve body. A stylus is mounted upon the outer end of the spindle and the inner end of the spindle is interconnected with an end of the spool through a bearing ball arrangement which converts the angular movements of the spindle into axial spool movements. The body of the valve is usually mounted upon the part of the machine tool which advances the cutting tool, such as the tool slide of a lathe, while the template is mounted in a stationary position with its profile presented to the stylus, such that the profile imparts angular motion to the spindle and axial motion to the spool as the valve is advanced along the template profile. The valve is interconnected with a hydraulic motor which shifts the slide and cutting tool in a path corresponding to the template profile so as to generate the profile in the rotating workpiece.

The universal tracer is extensively used in generating profiles which are complex and which have abrupt slopes departing inwardly or outwardly from the longitudinal axis of the pattern. On the other hand, the design of the stylus makes it necessary to lock the spindle against rotary motion while permitting it to tilt universally. The locking or stabilizing mechanism may take various forms, for example, it may consist of an accentric cross pin journalled in the valve body and extending transversely through a slot formed in the spindle, as disclosed in Patent No. 2,586,654, and in other patents. Another form consists of a disk attached to the spindle and having a slot or slots traversed by a stationary element to prevent spindle rotation. It will be understood that the stabilizing mechanism naturally introduces frictional resistance into the structure which detracts from the sensitivity of the tracer valve.

It has therefore been another objective of the invention to provide a valve structure which eliminates the need for the stabilizing mechanism and the attendant frictional resistance, and which permits the stylus of the valve to trace the template profile under relatively light stylus pressure.

According to the present invention, the valve stem is mounted for pivotal motion in a single plane, as distinguished from the universal motion of conventional valves, utilizing a pair of opposed pivot pins mounted within the valve body and engaging the spindle on diametrically opposite sides. The spindle is free to tilt angularly about the axis of the pivot pins with extremely low frictional resistance; on the other hand, the pins inherently resist rotary forces acting upon the spindle and thus make the use of stabilizing mechanism unnecessary.

A further objective has been to provide a simple efficient structure for adjusting the pivot pins and spindle axially with respect to the valve body to obtain the most efficient tracing action.

According to this aspect of the invention, the spindle projects loosely through a cylindrical pivot carrier which slidably interfits a bore formed in the valve body at a point spaced from the valve spool. The pivot pins are threaded into the carrier from diametrically opposite sides along a common axis and their inner ends are cone-shaped and project into correspondingly cone-shaped recesses formed in the opposite sides of the spindle, to provide a precise bearing engagement with the spindle. In order to adjust the valve for the desired operating characteristics, an adjustment ring is threaded into the valve body above the pivot carrier and is arranged to engage and force the carrier and spindle toward the spring-biased spool.

The present tracer valve is intended particularly for use on duplicating lathes of the type having an angulated slide mounted on a carriage and movable relative to the carriage under tracer control. Generally speaking, in an angulated tracer of this type, the carriage is advanced continuously along a straight line path, while the angulated slide, which carries the cutting tool and tracer valve, is shifted at an acute angle, for example, 45 degrees relative to the line of carriage travel under tracer control. However, this angle may be greater or less than 45 degrees, depending upon variable factors, such as the type of work for which the machine is intended. In tracing a template profile, the continuous motion of the carriage causes the cutting tool to move in a straight line path which is modified by relative motion of the angulated slide, such that the tool point may move on a line at right angles to the line of carriage motion to cut a 90 degree shoulder in the face of the workpiece, or even an overhanging shoulder. As applied to a lathe having an angulated slide of this character, the present tracer valve preferably is mounted on the angulated slide with the common axis of the pivot pins at right angles to the line of angular slide travel, such that the tracer spindle and stylus tilts in a plane which is parallel to the angular path of slide travel.

Another feature of the invention resides in an arrangement whereby the plane of tilting motion of the spindle and stylus may be varied in a simple manner with respect to the body of the valve in order to accommodate various operating conditions, such as the path of motion of the angulated slide. For this purpose, the cylindrical pivot carrier of the pivot pins is mounted for rotary adjustment with respect to the valve body, such that the pivot carrier may be rotated to adjust the common axis of the pivot pins in relation to the angular path of slide motion, thereby to provide the best operating angle for a given lathe.

The various features and advantages of the present invention will be more clearly apparent to those skilled in the art from the following detailed description taken in conjunction with the drawings.

In the drawings:

FIGURE 1 is a longitudinal sectional view of a tracer valve incorporating the present improvements.

FIGURE 2 is a top plan view, as projected from FIGURE 1, showing the relationship of the valve with the profile of a template.

FIGURE 3 is a bottom plan view as projected from FIGURE 1.

FIGURE 4 is an enlarged fragmentary sectional view of the upper portion of the valve, taken along line 4—4 of FIGURE 1.

FIGURE 5 is an enlarged cross sectional view of the upper portion of the valve taken along line 5—5 of FIGURE 1.

FIGURE 6 is a top plan view similar to FIGURE 1, showing a modified stylus mounted on the stem of the valve.

FIGURE 7 is a fragmentary side elevation further illustrating the stylus of FIGURE 6.

FIGURE 8 is a fragmentary sectional view taken along line 8—8 of FIGURE 6, further illustrating the stylus mounting and internal components of the valve.

Described generally with reference to FIGURE 1, the valve body comprises a rectangular base 1 and a cylindrical sleeve 2 attached to the base by means of a fitting 3. The valve is actuated by a spindle or stem, indicated generally at 4, having a stylus 5 at its outer end arranged to trace the profile of a template, as indicated at 6 in FIGURE 2. The inner end of the spindle 4 actuates a valve spool 7 which controls the flow of hydraulic fluid in response to the single plane tilting motion of the spindle, as explained below.

The present tracer valve may be utilized in various types of machine tools and is intended particularly for controlling the cutting tool of a lathe, either in shaft turning or in face cutting operations. By way of example, in a shaft turning operation, the tracer valve is mounted upon the angulated slide as outlined above, and the slide is advanced longitudinally by the carriage, there being provided a hydraulic motor, such as a piston and cylinder, which shifts the slide along its acute angle with respect to the path of carriage travel. The template 6 is mounted in a stationary position above the slide so that its profile is presented to the stylus 5 of the tracer valve.

As shown in FIGURES 1 and 2, the stylus is in the form of an upright pin which is detachably mounted by means of a collet upon the upper end of the valve spindle 4. The pin-type stylus is intended particularly for tracing the profile of a flat template, that is, one consisting of a flat plate having the required profile machined in its forward edge which is traversed by the upright stylus 5.

In other instances, the template may be in the form of a cylindrical shaft to provide the slopes and shoulders which are to be generated in the workpiece. In this event, the up-right pin-type stylus 5 is replaced with a pencil-type stylus which projects along a horizontal axis from the spindle, with its outer end presented to the surface of the cylindrical template. This structure is described in detail later with reference of FIGURES 6, 7 and 8.

During a longitudinal shaft turning operation under tracer control, the carriage is advanced continuously so as to carry the angulated slide longitudinally with respect to the template and workpiece. The stylus thus traces the profile of the template, and upon encountering a slope or shoulder, is tilted angularly with respect to the pivot assembly as indicated generally at 8 in FIGURES 4 and 8. The same principle is utilized in a face cutting operation, except that in this case, the cross slide or equivalent machine element is advanced transversely with respect to the axis of the rotation of the workpiece, while the slide is shifted under tracer control along a path which is acute to the transverse path of carriage motion.

As described later in detail, the pivot assembly 8 mounts the tracer spindle for motion in a single plane; this motion is transmitted through a bearing ball 10 to the valve spool 7 so as to convert the tilting motion of the spindle into axial spool motion. The spool 7 controls the flow of hydraulic fluid to the hydraulic motor of the angulated slide so as to shift the slide along its angular path, whereby the coordinated slide and carriage motions reproduce the profile of the template in the rotating workpiece.

In the preferred embodiment, the tracer valve is oriented with respect to the angulated slide with the common axis of its pivot pins disposed substantially at right angles to the path of slide movement as indicated by the broken lines in FIGURES 2 and 6; the slide is advanced longitudinally with the carriage, as indicated by the arrows in these views. This arrangement provides the most sensitive response of the tracer valve to the angles of the slopes and even overhanging shoulders which are traversed by the stylus. The pivot assembly 8, by virtue of its antifriction action, permits the spindle to tilt in response to forces which act at various angles, including those acting along lines almost parallel to the common axis of the pivot pins. This sensitivity, in actual practice, permits the stylus to respond to shoulders and slopes in the template profile having a combination of angles up to at least 150 degrees.

In order to adapt the valve to lathes having slides which move along different angular paths under tracer control, the pivot assembly 8 is adapted to be rotatably adjusted with respect to the valve body so as to vary the plant of tilting motion of the stylus. This arrangement also permits the valve to be adjusted to suit different types of workpieces which may be duplicated upon a given lathe without disturbing the tracer valve, which preferably is permanently attached to the slide. The structure for adjusting the valve to a desired plane of operation is explained later in detail.

Referring to FIGURE 1, the spool 7 is slidably interfitted in a flow control sleeve 11, having internal grooves 12 which coact with the external grooves 13 of the spool 7. The sleeve 11 is provided with appropriate intake and discharge ports communicating with the hydraulic supply unit and with the cylinder assembly of the angulated slide. One of the ports is indicated at 14 in FIGURE 1; however, since the fluid circuit is not essential to an understanding of the invention, the remaining ports and passageways have been omitted from the disclosure.

It will be understood that when the spindle 4 is in a neutral position, as shown in FIGURE 1, there is no communication between the respective sets of grooves 12 and 13; and that axial motion of the spool 7 in either direction from the neutral position establishes communication between the grooves 12 and 13. It will also be understood that when the spool is shifted axially in either direction from neutral, the grooves 12 and 13 are appropriately interconnected to activate the hydraulic cylinder assembly and angulated slide in the appropriate direction until the neutral spool position is re-established.

Described in detail, the valve spool 7 normally is urged axially into contact with the bearing ball 10 by a compression spring 15 which is seated in a closure cap 16 threaded as at 17 into the lower end of the base or block 1. The adjacent ends of spindle 4 and spool 7 are provided with respective conical recesses 18—18, the ball 10 being seated in the recesses so that the angular movements of the stem act through the ball to shift the spool axially. In the neutral position illustrated, the stem is preloaded by engagement of the stylus with the template, such that the spool is held downwardly in the neutral position by the spindle 4 counter to the force of spring 15. The spool 7 is thus held in a balanced condition through the biasing action of the spring 15 acting against one end and the camming action of the ball at the opposite end reacting against the spindle, which is slightly tilted through engagement with the template 6. The spool 7 will thus shift axially in either direction in response to the tilting motion of the spindle 4 in a single plane as the stylus traces the template profile.

In order to provide control of the valve independently of the stylus, a retracting screw 19 is engaged in a threaded bushing 20 of spool 7 and projects outwardly through the closure cap 16. Threaded on the screw 19 is a retracting disk 21 which is locked in adjusting position by a nut 22. The disk is arranged to provide a connection with a hand-operated control mechanism (not shown) on the machine tool to permit manual operation of the valve so as to retract or advance the cutting tool. This mechanism is utilized only in setting up the machine and is not employed during a normal tracing operation.

The fitting 3, which connects the sleeve 2 to the block 1, is provided with a flange 23 attached to the block by screws 24 as indicated in FIGURE 2. The fitting includes a cylindrical nose 25 projecting upwardly from the flange and providing a threaded engagement 26 with the lower end of the sleeve 2.

The pivot assembly, previously indicated at 8, comprises a cylindrical pivot carrier 27 shiftably interfitted in a counter turned upper portion 28 of the sleeve 2. As best shown in FIGURES 5 and 8, the upper portion of spindle 4 is pivotally journalled by a pair of pivot pins 30—30, each having a threaded outer portion 31 and a cone-shaped inner end 32 which forms the pivot bearing. The opposed pivot pins are threaded into the pivot carrier 27 from a diametrically opposite sides and reside along a common axis, as previously indicated by the broken line in FIGURES 2, 5 and 6. The upper portion of the spindle 4 includes an enlarged head 33 having a cross bore 34 terminating in respective cone-shaped recesses 35—35 which are engaged by the cone-shaped ends 32 of the pivot screws. The pivot carrier 27 has an internal bore 36 somewhat larger than the head portion 33 of the spindle so as to provide the operating clearance 37 for rocking motion of the spindle 4 about the pivot pins. As best shown in FIGURE 8, the pivot pins are locked in their adjusted positions by the respective lock screws 38 threaded through the pivot carrier 27 and engaging the pivot pins 30.

In order to adjust the valve for proper operation, an adjusting cap 40 is threaded as at 41 into the upper end of sleeve 2 and engages the upper end of the pivot carrier 27, which is slidable with respect to the counter turned bore 28 in which it is fitted. The adjusting cap 40 is provided with apertures 42 for engagement with a spanner wrench so as to force the pivot carrier 27 downwardly. Since the carrier 27 is pivotally connected to the spindle 4, the downward adjustment acts against the compression spring 15 through the ball 10 and spool 7. When the proper operating characteristics are obtained, the adjusting cap 40 is locked in position by a locking screw 43 (FIGURE 8).

As noted earlier, the common axis of the pivot pins is arranged for rotary adjustment with respect to the valve body in order to accommodate the valve to slides having different angles of motion and also in some cases to accommodate for the character of the work. As shown in FIGURE 4, the pivot carrier 27 is locked in its adjusted position by a set screw 44 which engages in a vertical slot 45 formed in the pivot carrier. When the carrier is adjusted axially, as explained above, the screw is loosened sufficiently to free the carrier for axial motion; however, the inner end of the set screw 44 preferably remains in the slot to prevent rotation of the carrier.

In order to change the angle of the pivot axis, the set screw 44 is backed out sufficiently to disengage the slot 45 so as to permit the spindle and carrier assembly to be rotated to a new position with respect to the valve body. Additional slots 45 (not shown) for various angular adjustments may be machined in the carrier to provide engagement by the set screw 44 in the several positions of rotary adjustment.

As best shown in FIGURE 4, the upper end of the spindle 4 is provided with a threaded stud 46 screwed endwisely into the stem 47, which carries the vertical pin-type stylus 5. A lubricant bore 48 extends axially from the upper end of the threaded stud 46, through the spindle 4 and its lower end communicates with the cross bore 34 (FIGURE 8) to lubricate the pivot bearings. The excess lubricant follows the spindle 4 downwardly from the pivot pins and collects upon a shoulder 50 at the lower portion of the spindle. An oil hole 51 extends from the shoulder 50 into communication with the conical recess 18 of the spindle so as to supply lubricant to the bearing ball 10.

The stylus 5 is mounted upon the upper end of stem 47 through a collet 52 of conventional design which is threaded upon the stem to establish a clamping engagement with stylus 5. This permits the stylus to be interchanged to suit the particular requirements of a given job. To apply oil to the lubricant bore 48, the stem 47 may include a bore 53 communicating with the lubricant bore 48.

As noted earlier, the vertical stylus 5 may be interchanged with a horizontal, ballpoint stylus for use in tracing a cylindrical template, as shown in FIGURES 6–8. According to this arrangement, the pencil-type stylus, indicated at 54, is mounted at the upper end of a vertical stem 55. The outer end of the stylus 54 which contacts the template profile, is located at the central axis of the valve, as indicated in FIGURE 6. For this purpose, the vertical stem 55 is mounted in an offset position by a foot 56 attached to the lower end of the stem. The foot 56 is bored to interfit the threaded stud 46 (in place of the stem 47—FIGURE 4) and is clamped in place by an acorn nut 57. The stylus 54 is adjustably mounted with respect to the upper end of stem 55 and is locked in adjusted position by a set screw 58. The nut 57 seals off the lubricant bore and may readily be removed when it is necessary to oil the valve.

From the foregoing disclosure, it will be understood that the cone point engagement of the pivot pins with the spindle 4 journals the spindle for tilting, single plane motion with very low frictional resistance as compared with the conventional ball and socket mounting. Moreover, the pivot mounting prevents rotary spindle motion and thus eliminates the conventional stabilizing mechanism of the conventional valve. By reason of its easy operation, the valve responds to the template profile under relatively light stylus pressure, thus improving the sensitivity of the valve. Prolonged testing and actual operation has demonstrated that the improved valve reproduces a profile with extreme precision and duplicates workpieces within substantially closer tolerances than is possible with conventional equipment.

Having described my invention, I claim:

1. In a tracer valve having an elongated valve casing including an axial bore, a valve spool mounted for axial motion in one end portion of said casing, a tracer spindle extending axially through said valve casing and outwardly beyond the end thereof opposite said spool, and motion transmitting means interconnecting the spool and spindle, the improvement which comprises a pivot carrier having a central opening therein, said pivot carrier loosely encircling said spindle, said pivot carrier being slidably interfitted into the end of the valve casing opposite said spool, an adjustment element threaded into the end of the valve casing and engaging the pivot carrier for shifting the same axially relative to the casing, a pair of pivot pins projecting inwardly from opposite sides of said pivot carrier along a common axis generally at right angles to the longitudinal axis of the valve casing, said pivot pins having inner ends projecting into the central opening of said pivot carrier and into bearing engagement with diametrically opposite sides of said spindle and thereby pivotally supporting said spindle for rocking motion in a single plane relative to the lonigtudinal axis of the valve casing, said motion transmitting means shifting the spool axially in response to the rocking movements of the spindle, said pivot pins adapted to absorb forces acting on the spindle along planes angular to said single plane and to convert said forces into single plane forces.

2. In a tracer valve having a valve casing including an axial bore, a valve spool mounted for axial motion in one end portion of said axial bore, spring means yieldably urging said spool inwardly of the valve casing, a tracer spindle extending axially through said valve casing and outwardly beyond the end thereof opposite said spool and a bearing ball interconnecting the spindle and spool, the improvement which comprises a pivot carrier having a central opening therein, said pivot carrier loosely encircling said spindle and being shiftably interfitted into the end of the valve casing opposite said spool, an adjustment ring threaded into the outer end of said casing and engaging said pivot carrier, pivot means mounted in said pivot carrier and engaging the spindle, said pivot means journalling said spindle for rocking motion in a single plane relative to the longitudinal axis of the valve casing, said threaded adjustment ring adapted to be rotated relative to the valve casing, thereby to adjust the pivot carrier, spindle, bearing ball and spool axially relative to the valve casing and counter to said spring means said outer portion of the spindle adapted to trace the profile of a template, whereby the spindle is rocked relative to the pivot means in said single plane in response to the template profile, said pivot means adapted to absorb thrust forces acting upon said tracer spindle along planes angular to said single plane and to convert said forces into spindle motion in said single plane, said bearing ball adapted to shift the spool axially counter to said spring means in response to the single plane rocking motion of the spindle.

3. In a tracer valve having a valve casing including an axial bore, a valve spool mounted for axial motion in one end portion of said casing, a tracer spindle extending axially through said valve casing and outwardly beyond the end thereof opposite said spool, and motion transmitting means interconnecting the spool and spindle, the improvement which comprises a pivot carrier having a central opening therein, said pivot carrier loosely encircling said spindle, said pivot carrier being interfitted into the end of the valve casing opposite said spool, a pair of pivot elements projecting inwardly from opposite sides of said pivot carrier along a common axis generally at right angles to the longitudinal axis of the valve casing, said pivot elements being in bearing engagement with the opposite sides of said spindle and thereby pivotally supporting said spindle for rocking motion in a single plane relative to the longitudinal axis of the valve casing, said motion transmitting means converting said rocking motion into axial spool motion, said pivot carrier being free for rotary adjustment relative to the valve casing, thereby to shift the single plane of rocking motion of the spindle relative to the valve casing, and releasable means for locking the pivot carrier in said position of rotary adjustment relative to the valve casing.

4. In a tracer valve having a valve casing including an axial bore, a valve spool mounted for axial motion in one end portion of said casing, a tracer spindle extending axially through said valve casing and outwardly beyond the end thereof opposite said spool, and motion transmitting means interconnecting the spool and spindle, the improvement which comprises a pivot carrier having a central opening therein, said pivot carrier loosely encircling said spindle, said pivot carrier being slidably interfitted into the end of the valve casing opposite said spool, an adjustment element threaded into the end of the valve casing and engaging the pivot carrier for shifting the same axially relative to the casing, a pair of pivot pins projecting inwardly from opposite sides of said pivot carrier along a common axis generally at right angles to the longitudinal axis of the valve casing, said pivot pins having inner ends projecting into the central opening of said pivot carrier and into bearing engagement with diametrically opposite sides of said spindle and thereby pivotally supporting said spindle for rocking motion in a single plane relative to the longitudinal axis of the valve casing, said motion transmitting means shifting the spool axially in response to the rocking movements of the spindle, said pivot carrier being free for rotary adjustment relative to the valve casing while the same is held in the axially adjusted position by said threaded adjustment element thereby to shift the single plane of rocking motion of the spindle relative to the valve casing, and releasable means for locking the pivot carrier in said portion of rotary adjustment.

References Cited in the file of this patent

UNITED STATES PATENTS

| | | |
|---|---|---|
| 1,952,231 | Anderson | Mar. 27, 1934 |
| 2,743,584 | Rosebrook | May 1, 1956 |
| 2,849,206 | Waterson | Aug. 26, 1958 |
| 2,994,502 | Ruzick | Aug. 1, 1961 |

FOREIGN PATENTS

| | | |
|---|---|---|
| 324,482 | Switzerland | of 1957 |